Oct. 16, 1956     W. A. DUNCAN     2,766,959
ATTACHING MEANS FOR EXTENSION TABLE SLIDE MECHANISM
Filed May 3, 1955
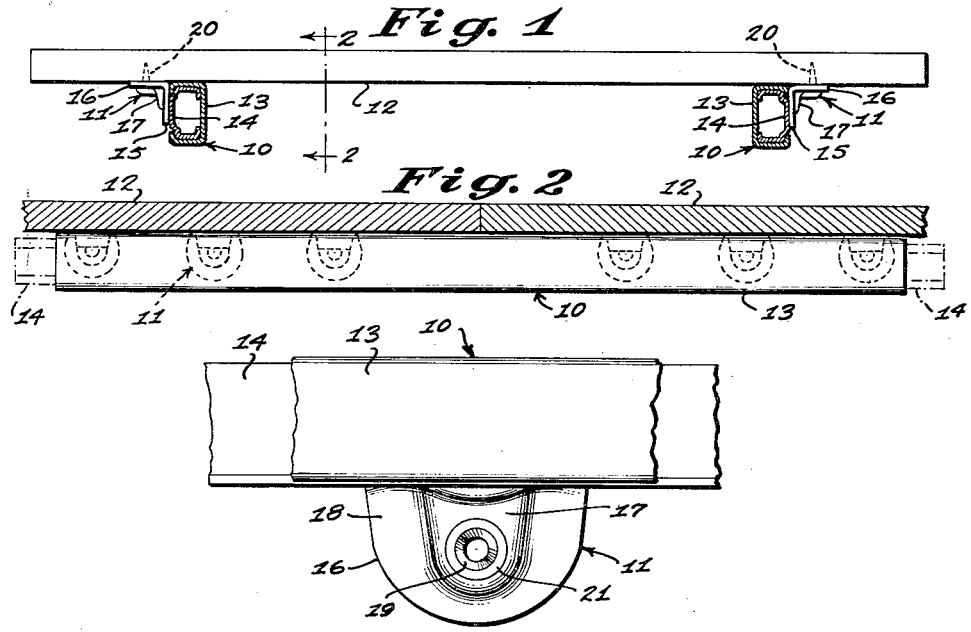
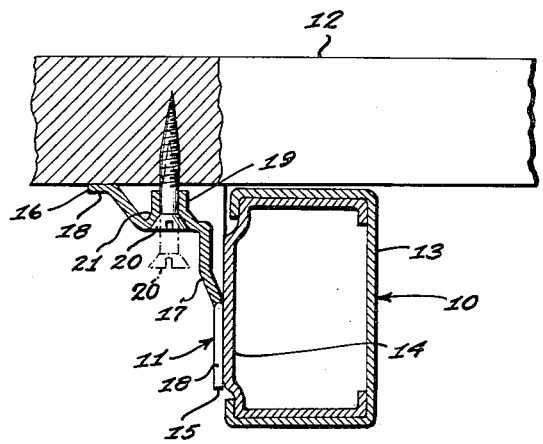
INVENTOR.
WILLIAM A. DUNCAN
BY
Parrott & Richards
ATTORNEYS

United States Patent Office 2,766,959
Patented Oct. 16, 1956

2,766,959

ATTACHING MEANS FOR EXTENSION TABLE SLIDE MECHANISM

William A. Duncan, Statesville, N. C., assignor to Acme Homes Metal Works, Inc., a corporation of North Carolina Application May 3, 1955, Serial No. 505,735

1 Claim. (Cl. 248—248)

This invention relates to extension table constructions of the type incorporating extension slide mechanisms, and more particularly to improved means for securing the extension slide mechanisms to the primary leaves of such tables.

In my copending application Serial No. 184,695, filed September 13, 1950, of which the instant application is a continuation-in-part, and which was abandoned May 4, 1955, in favor of this application, there is described a telescopic, metal, extension slide mechanism incorporating means for securing it to the underside of the primary leaves of an extension table so that the primary leaves may be moved apart to allow disposition of an intermediate leaf between them for increasing the length of the table when desired, and which means is adapted for supporting and guiding fastening means, such as screws, as they are driven for attaching the slide mechanism to the table leaves, as disclosed and claimed more particularly by this application.

The present invention is described in detail below in connection with the accompanying drawing, in which:

Fig. 1 is a transverse sectional view of a pair of slide mechanisms as attached to the underside of a table leaf;

Fig. 2 is a sectional detail taken substantially on the line 2—2 in Fig. 1;

Fig. 3 is a fragmentary plan view of an extension slide mechanism such as is shown in Fig. 1 and including an illustration of the securing means therefor; and Fig. 4 is an enlarged fragmentary transverse sectional detail of the extension slide mechanism shown in Fig. 3, and further illustrating the manner in which fastening means are supported and guided thereby.

Referring now in detail to the drawing, Fig. 1 illustrates an arrangement of telescoping, metal, extension slide mechanisms 10 incorporating attaching means 11 for securing them to the underside of an extension table leaf 12. The extension slide mechanisms 10 may comprise an outer central telescoping member 13 that would be attached to table legs or the like (not shown), and inner telescoping members 14 both of which are arranged with the attaching means 11 for securing to the underside of the primary leaves 12 of an extension table so that the leaves 12 may be moved apart to allow disposition of an intermediate leaf between them and illustrated and described in further detail in U. S. Patent No. 2,676,858.

The attaching means 11 each comprise a bracket member having arm portions 15 and 16 disposed at right angles, with a reinforcing boss 17 raised in the inwardly disposed faces of the arm portions 15 and 16 and extending continuously between the portions 15 and 16 but arranged to leave continuous, flat, edge flanges 18 of substantial width remaining at the outwardly disposed faces thereof. The edge flange 18 of the arm portion 15 serves for arranging the attaching means 11 in face to face abutment with the respective telescoping members 13 and 14 of the slide mechanism 10 and may be fixed thereto as by welding or the like. The arm portion 16 of the attaching means 11 is provided with a tubular extrusion 19 formed in the reinforcing boss 17 and extending toward the outwardly disposed face of arm portion 16 for receiving a fastening screw 20 therethrough to attach the arm portion 16 to the table leaf 12 with the edge flange 18 in face to face abutment at the underside of the table leaf 12 as shown in Fig. 3. The tubular extrusion 19 is formed with a tapered length immediately adjacent the reinforcing boss 17 to provide a countersunk seat 21 for the head of the fastening screw 20 and with a substantial cylindrical length extending from the tapered portion thereof proportioned in diameter for supporting and guiding the fastening screw 20 as it is driven (from the dotted line position shown in Fig. 3) for attaching the table leaf 12, and thereby substantially facilitating the operation of attaching the slide mechanisms 10 by positioning and holding the fastening screw 20 uprightly when it is initially put in place for driving as well as continuing to guide it until fully seated.

The present invention has been described in detail above for the purpose of illustration only and is not intended to be limited by this description or otherwise except as defined in the appended claim.

I claim:

Means for securing a telescoping, metal, extension slide mechanism to the primary leaves of an extension table, said means comprising a bracket having a first arm portion for attachment to said slide mechanism and a second laterally extending arm portion for attachment to the underside of one of said primary leaves, said second laterally extending arm portion having a reinforcing boss and a tubular extrusion formed in said reinforcing boss and directed toward said table leaf when attached thereto, said tubular extrusion having a tapered length adjacent said reinforcing boss providing a countersunk seat for the head of a fastening screw and a substantial cylindrical length extending therefrom for supporting and guiding said fastening screw as it is driven for attaching said table leaf.

References Cited in the file of this patent

UNITED STATES PATENTS

| 576,110 | Graves | Feb. 2, 1897 |
| 662,935 | Hibberd et al. | Dec. 4, 1900 |
| 744,265 | Voight | Nov. 17, 1903 |
| 1,157,037 | Peirce | Oct. 19, 1915 |